United States Patent
Yang et al.

(10) Patent No.: US 9,764,388 B2
(45) Date of Patent: Sep. 19, 2017

(54) METHOD FOR PREPARING TANTALUM POWDER OF CAPACITOR GRADE WITH HIGH NITROGEN CONTENT, TANTALUM POWDER OF CAPACITOR GRADE PREPARED THEREBY, AND ANODE AND CAPACITOR PREPARED FROM TANTALUM POWDER

(71) Applicants: NINGXIA ORIENT TANTALUM INDUSTRY CO., LTD., Ningxia (CN); NATIONAL ENGINEERING RESEARCH CENTER FOR SPECIAL METAL MATERIALS OF TANTALUM AND NIOBIUM, Ningxia (CN)

(72) Inventors: Guoqi Yang, Shizuishan (CN); Aiguo Zheng, Shizuishan (CN); Yuewei Cheng, Shizuishan (CN); Yuezhong Ma, Shizuishan (CN)

(73) Assignees: NINGXIA ORIENT TANTALUM INDUSTRY CO., LTD., Ningxia (CN); NATIONAL ENGINEERING RESEARCH CENTER FOR SPECIAL METAL MATERIALS OF TANTALUM AND NIOBIUM, Ningxia (CN)

( * ) Notice: Subject to any disclaimer, the term of this patent is extended or adjusted under 35 U.S.C. 154(b) by 0 days.

(21) Appl. No.: 14/763,389

(22) PCT Filed: Dec. 10, 2013

(86) PCT No.: PCT/CN2013/088935
§ 371 (c)(1),
(2) Date: Jul. 24, 2015

(87) PCT Pub. No.: WO2015/085476
PCT Pub. Date: Jun. 18, 2015

(65) Prior Publication Data
US 2016/0059319 A1    Mar. 3, 2016

(51) Int. Cl.
*B22F 9/04* (2006.01)
*C22B 34/24* (2006.01)
(Continued)

(52) U.S. Cl.
CPC ............... *B22F 9/20* (2013.01); *B22F 9/04* (2013.01); *B22F 9/24* (2013.01); *C22B 34/24* (2013.01);
(Continued)

(58) Field of Classification Search
CPC ...... B22F 9/20; B22F 9/04; B22F 9/24; C22B 34/24; C22C 1/045; C22C 27/02; H01G 9/025; H01G 9/042; H01G 9/0525
(Continued)

(56) References Cited

U.S. PATENT DOCUMENTS

| | | | | |
|---|---|---|---|---|
| 5,442,978 A | * | 8/1995 | Hildreth | .............. C22B 34/24 75/363 |
| 6,238,456 B1 | * | 5/2001 | Wolf | .............. B22F 1/0096 419/34 |

(Continued)

FOREIGN PATENT DOCUMENTS

| CN | 1498144 | | 5/2004 |
|---|---|---|---|
| CN | 1699147 A | * | 11/2005 |

(Continued)

OTHER PUBLICATIONS

International Search Report as issued for PCT/CN2013/088935.
(Continued)

*Primary Examiner* — Harold Pyon
*Assistant Examiner* — Danny N Kang
(74) *Attorney, Agent, or Firm* — Pillsbury Winthrop Shaw Pittman, LLP

(57) ABSTRACT

A method for preparing a tantalum power of capacitor grade, comprising: solid tantalum nitride is added when potassium
(Continued)

Changes of DCL at different N contents fluotantalate is reduced by sodium. The method increases the nitrogen content in the tantalum powder, and at the same time improves the electrical performance of the tantalum powder. The specific capacitance is increased, and the leakage current and loss is improved. The qualification rate of the anode and the capacitor product is also improved. The method is characterized in that the nitrogen in the tantalum nitride diffuses between the particles of the tantalum powder, with substantially no loss, and thus the nitrogen content is accurate and controllable.

12 Claims, 1 Drawing Sheet

(51) Int. Cl.
| | | |
|---|---|---|
| | *H01G 9/00* | (2006.01) |
| | *B22F 9/20* | (2006.01) |
| | *B22F 9/24* | (2006.01) |
| | *C22C 1/04* | (2006.01) |
| | *C22C 27/02* | (2006.01) |
| | *H01G 9/025* | (2006.01) |
| | *H01G 9/042* | (2006.01) |
| | *H01G 9/052* | (2006.01) |

(52) U.S. Cl.
CPC .............. *C22C 1/045* (2013.01); *C22C 27/02* (2013.01); *H01G 9/025* (2013.01); *H01G 9/042* (2013.01); *H01G 9/0525* (2013.01)

(58) Field of Classification Search
USPC ......................................................... 252/500
See application file for complete search history.

(56) References Cited

U.S. PATENT DOCUMENTS

| | | | |
|---|---|---|---|
| 6,432,161 | B1 | 8/2002 | Oda et al. |
| 6,876,542 | B2 | 4/2005 | Oda et al. |
| 7,066,975 | B2 | 6/2006 | Oda et al. |
| 7,473,294 | B2 | 1/2009 | Oda et al. |
| 2004/0205947 | A1* | 10/2004 | Oda ...................... B22F 1/0088 29/25.03 |
| 2009/0180240 | A1 | 7/2009 | Li et al. |
| 2011/0308965 | A1 | 12/2011 | Rasheed et al. |

FOREIGN PATENT DOCUMENTS

| | | |
|---|---|---|
| CN | 1872461 | 12/2006 |
| CN | 101234425 | 8/2008 |

OTHER PUBLICATIONS

Extended European Search Report dated Aug. 5, 2016 for Appln. No. 13899315.9.
Office Action Korean Patent Application No. 10-2015-7024411 dated Jun. 19, 2017 with English translation.
Office Action EP Application No. 13 899 315.9 dated May 18, 2017.

* cited by examiner

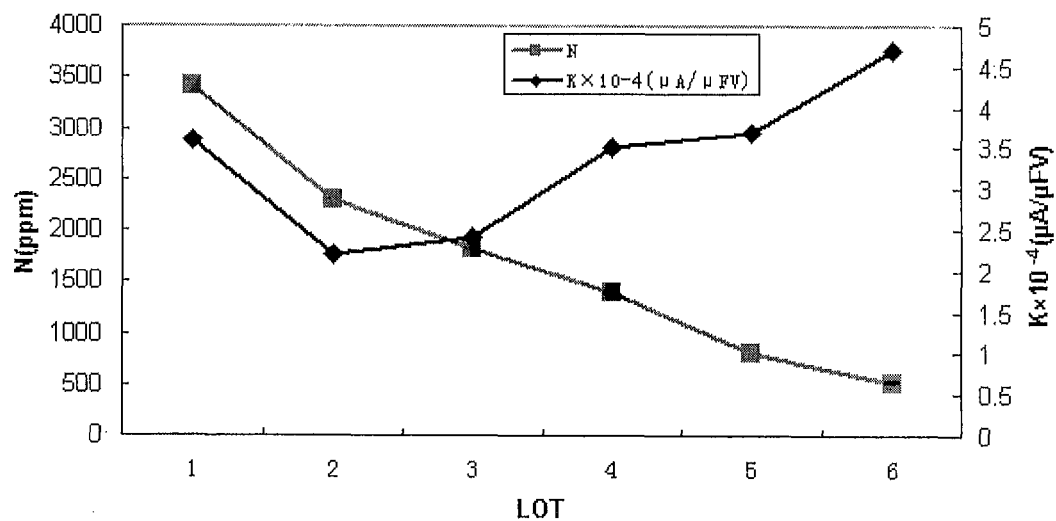

METHOD FOR PREPARING TANTALUM POWDER OF CAPACITOR GRADE WITH HIGH NITROGEN CONTENT, TANTALUM POWDER OF CAPACITOR GRADE PREPARED THEREBY, AND ANODE AND CAPACITOR PREPARED FROM TANTALUM POWDER

CROSS REFERENCE TO RELATED APPLICATIONS

This application is the U.S. National Stage of PCT/CN2013/088935 filed Dec. 10, 2013, the entire contents of which is incorporated herein by reference in its entirety.

TECHNICAL FIELD

The present invention relates to a method for preparing tantalum powder of capacitor grade with high nitrogen content, tantalum powder of capacitor grade prepared thereby, and anode and capacitor prepared from tantalum powder.

BACKGROUND

Metal tantalum is a valve metal. It can form a layer of dense oxide film on its surface to have a property of unilateral conduction. An anode film made of tantalum has chemical stability (especially in acidic electrolyte), high resistivity ($7.5 \times 10^{10}$ Ω·cm), high dielectric constant (27.6) and small leakage current. Furthermore, the anode film has advantages including a broad range of working temperature (−80 to 200° C.), high reliability, anti-vibration and long service life. It is an ideal material for preparing tantalum capacitor with small volume and high reliability.

Tantalum capacitor is an electronic device with tantalum as metal anode, having a dielectric oxide film which is directly formed on the surface of tantalum through the oxidation of the anode. Tantalum powder has a very high specific surface area. The specific surface area remains high even after pressing and sintering due to its characteristic pore structure, and thereby the resulting capacitor has high specific capacitance.

Among the methods for preparing tantalum powder, the reduction method of potassium fluotantalate with sodium is the most widely used and the most maturely developed preparation method worldwide.

The reduction method of potassium fluotantalate with sodium is a method in which tantalum powder of capacitor grade is prepared, using $K_2TaF_7$ and Na as main feedstocks, and using a halide salt such as NaCl, KCl or a mixture of halide salts as diluent, with the following main reaction mechanism:

$$K_2TaF_7 + 5Na = Ta + 5NaF + 2KF \quad (1)$$

The above reaction occurs between $K_2TaF_7$ and liquid sodium, in the nitrogen atmosphere and at certain temperature. The tantalum powder resulting from the reduction is water washed and acid washed, and is then heat-treated. Subsequently the powder is reduced and deoxidized with magnesium, and the final tantalum powder with high purity is obtained.

Currently tantalum powder of capacitor grade is developing in a direction of high specific capacitance and high purity. It is well known that the specific capacitance of tantalum powder is in proportion to its specific surface area. In other words, the smaller the mean particle diameter of tantalum powder is, the higher the specific surface area is, and the higher the specific capacitance is. The key technology to achieve high specific capacitance of tantalum powder is the preparation of tantalum powder with smaller mean particle diameter. In respect to the reduction method of potassium fluotantalate with sodium, the core of the development is to control the formation, the distribution and the growth of the crystal nucleus during the reduction with sodium by controlling the reduction conditions including the compositions of potassium fluotantalate and diluent dissolving salts, the reduction temperature, the rate of injection of sodium etc., in order to prepare the tantalum powder having certain specific surface area and particle diameter. A mechanical method is to obtain tantalum powder with finer particles by controlling the conditions of hydrogenation milling or ball milling. The reduction of halide with hydrogen uses preparation technology of nanoscale powder, and the particle size of the resulting tantalum powder is in nanoscale with very high specific surface area.

Doping is an important technical means to achieve high specific capacitance of tantalum powder, and thus is generally used in the production and the development of tantalum powder with high specific capacitance. The main purposes of doping during the preparation method of tantalum powder are: 1) to refine the tantalum powder; and 2) to inhibit the growth of grains of the tantalum powder, to the most possibly maintain higher specific surface area of the tantalum powder, and to reduce loss of specific capacitance of the tantalum powder. Doping can be conducted during various methods. Doped elements commonly used include N, Si, P, B, C, S, Al, O etc. and compounds thereof. Doped elements generally segregate at the surfaces of grain-boundaries, reacting with tantalum at high temperature to form various compounds of tantalum. Doping comprises not only incorporating one element in one step, but also doping multiple elements in multiple steps. By this way, tantalum powder can be refined, and at the same time loss of specific capacitance of tantalum powder can be reduced.

It is a widespread operation to dope nitrogen in tantalum powder in the tantalum powder industry, especially in the production of tantalum powder with high specific capacitance.

U.S. Pat. No. 6,876,542 provides a production method of nitrogen-containing metal powder, and porous sintered body and solid electrolytic capacitor using the metal powder. The nitrogen containing metal powder has a ratio W/S between the nitrogen content W (ppm) and the specific surface area S (m²/g) as measured by a BET method, that falls within a range from 500 to 3000. The patent further provides a method in which nitrogen is introduced during the reduction to increase nitrogen content in tantalum powder.

U.S. Pat. No. 7,066,975 provides nitrogen-containing metal powder, production method thereof, and porous sintered body and solid electrolytic capacitor using the metal powder. The patent provides nitrogen-containing metal powder which is a solid solution containing 50-20,000 ppm nitrogen, in which the metal is particularly tantalum, preferably containing P, B, O or a combination thereof. It is characterized that nitrogen is in solid solution form, and the mean particle diameter of the nitrogen-containing metal powder is in a range of 80 to 360 nm.

U.S. Pat. No. 7,473,294 provides nitrogen-containing metal powder, production method thereof, and porous sintered body and solid electrolytic capacitor using the metal powder. The patent provides nitrogen-containing metal powder (having surface layer and inner layer) which is a solid solution containing 50-20,000 ppm nitrogen. The nitrogen is in solid solution form. The metal is tantalum. The nitrogen uniformly permeates from the surface layer of the metal to the inner layer. And the particle diameter of the metal powder is ≤250 nm.

U.S. Pat. No. 6,432,161 provides another nitrogen-containing metal powder, production method thereof, and porous sintered body and solid electrolytic capacitor using the metal powder. The patent provides a production method of nitrogen-containing metal powder, comprising a compound of niobium or tantalum is reduced with a reducing agent, and nitrogen is simultaneously incorporated into the reaction system, and nitrogen-containing niobium or tantalum powder in solid solution form is formed, wherein the nitrogen is simultaneously incorporated in niobium or tantalum powder. The patent is an alternative to the reduction method of potassium fluotantalate with sodium, which is suitable for the reduction doping nitrogen of other compounds of niobium or tantalum.

Chinese patent application CN1498144A relates to a preparation method of sintered particles. The particles is made of a mixture of refractory metals and refractory metal nitrides. It is found that the particles have higher proportion of intra-aggregate pores as than those singly made of refractory metals or nitrides of refractory metals. There is provided improved powder of capacitor grade, anode and capacitor made thereby. Where the mixture contains 50 to 75 w/w % of refractory metal nitrides, the porosity and the total intrusion volume of the particles are maximized. The total pore surface area of the particles is 50% higher than that of single refractory metal nitrides. A substrate consisting of a powder mixture of 50/50 or 25/75 w/w % refractory metals/refractory metal nitrides generates solid capacitor with higher recovery rate of capacitor and lower ESR. To be brief, tantalum and tantalum nitride or niobium and niobium nitride are directly mixed, and are shaped by pressing, to form anode of capacitor.

Accordingly, the methods for doping nitrogen in tantalum powder used in prior art focus on the incorporation of nitrogen-containing gas into the reaction system. The nitrogen is present in tantalum powder in solid solution form. However, such methods for doping nitrogen is less effective, and tantalum powder with high nitrogen content cannot be obtain, and the amount of doped nitrogen cannot be accurately controlled. Therefore, there is still need for a method for doping nitrogen in tantalum powder having good effectiveness and controllability.

SUMMARY OF THE INVENTION

In a first aspect of the present invention, there is provided a method for preparing tantalum powder of capacitor grade, comprising the steps of:

(1) KCl and KF are fed into a reactor, and temperature is increased;

(2) $K_2TaF_7$ is fed to the reactor, and tantalum nitride powder is simultaneously fed hereto depending on desired amount of doped nitrogen;

(3) the reactor is heated to 880 to 930° C., and the temperature is kept;

(4) the reactor is cooled to 800 to 880° C., and sodium is fed hereto;

(5) the temperature is kept at 880 to 930° C. until the reaction temperature drops rapidly; and (6) the tantalum powder resulted from step (5) is after-treated, and nitrogen-doped tantalum powder product is obtained.

The present invention achieves tantalum powder with higher nitrogen content than those in prior art. And the amount of doped nitrogen in the tantalum powder can be accurately controlled, allowing desired amount of nitrogen to incorporate into the tantalum powder, providing the tantalum powder product with corresponding electrical performance. Therefore, the electrical performance of the resulting product precedes those of the tantalum powder made by traditional methods for doping nitrogen.

In one embodiment, the tantalum powder for preparing the tantalum nitride powder which is fed in step (2) has essentially the same mean particle diameter as the tantalum powder product resulted from step (6), and thus the final tantalum powder has uniform particle size.

In one embodiment, the amount of doped nitrogen is 1000 to 3000 ppm, allowing the product to have lower leakage current and the tantalum powder to have preferred electrical performance.

In one embodiment, the weight ratio between the sodium which is fed in step (4) and the $K_2TaF_7$ which is fed in step (2) is in a range of 30 to 32:100. In one embodiment, step (2) is performed at 900 to 950° C. In one embodiment, steps (3) to (5) are performed under agitation. In some embodiments, agitator blades are used, and are elevated in step (4). In one embodiment, the time for keeping the temperature in step (3) is at least 1 hour. In one embodiment, the after-treatment in step (6) includes crushing, water washing, acid washing, pelletizing or a combination thereof.

In a second aspect of the present invention, there is provided tantalum powder prepared by the preparation method according to the first aspect of the present invention.

In a third aspect of the present invention, there is provided a tantalum anode made of the tantalum powder according to the second aspect of the present invention.

In a fourth aspect of the present invention, there is provided a tantalum capacitor comprising the tantalum anode according to the third aspect of the present invention.

The tantalum powder and the tantalum anode and the tantalum capacitor made thereof according to the present invention have high nitrogen content and accurately controllable amount of doped nitrogen, and thus have preferred electrical performance than the tantalum powder, the tantalum anode and the tantalum capacitor in prior art.

Above embodiments can be combined as required, and the resulting technical solutions are still within the scope of the present invention.

BRIEF DESCRIPTION OF THE DRAWING

FIG. 1 shows a curve graph in which the electrical performance of the products of the Examples according to the present invention and the Comparative Example change with nitrogen content.

In the FIGURE, DCL represents leakage current K×$10^{-4}$ (μA/μFV), and LOT represents series numbers of the samples.

DETAILED DESCRIPTION

The present invention provides a method for doping nitrogen in tantalum powder, comprising the steps of:

Firstly, KCl and KF are charged into a reducing furnace, and temperature is increased according to predetermined program. When the temperature reaches 900 to 950° C., $K_2TaF_7$ is added through feeding inlet, and tantalum nitride powder made of tantalum powder of the same grade is added simultaneously. At this time the temperature is cooled to about 800° C. Agitation is started after the charging, and the reducing furnace is heated to 880 to 930° C. The temperature is kept, and the time for keeping temperature is recorded. After a period of time, the agitator blade is elevated, and the agitation continues, leading to uniform temperature and composition of the molten salt system. The temperature is decreased to 800 to 880° C., and sodium is added smoothly. Agitation is kept as the sodium is added, to timely spread the resulting heat and keep uniform temperature of the whole molten salt system, and at the same time to timely transfer particles of the formed tantalum powder outside of the reaction zone and avoid rapid growth of the particles which results in poor uniformity. The temperature is kept at a relatively stable level in a range of 880 to 930° C. The weight ratio between sodium and $K_2TaF_7$ added in the reduction reaction is in a range of 30 to 31:100. When the reaction temperature drops rapidly, it can be determined that the reduction reaction is over. Raw tantalum powder with uniformly doped nitrogen is obtained.

During the above reaction, the raw tantalum powder is collided and contacted with the added tantalum nitride powder, allowing the nitrogen in the tantalum nitride to spread between the particles, resulting in primary particles of the tantalum powder with high nitrogen content and relatively uniform doping.

The tantalum powder with relatively uniform nitrogen content agglomerates, resulting in a bulk material. The material is subject to steps including crushing, water washing, acid washing, pelletizing etc., resulting in tantalum powder product with high nitrogen content.

The tantalum powder with high nitrogen content can be used to produce tantalum anode and tantalum capacitor by the methods in prior art.

In this context, the term "tantalum powder of the same grade" is referred that the tantalum powder for preparing the tantalum nitride powder which is added in the reaction has essentially the same mean particle diameter as the tantalum powder product, and thus the final tantalum powder has uniform particle size.

EXAMPLES

In order to further illustrate the present invention, embodiments according to the present invention are described with reference to the Examples. However, it is understood that the description is for further illustration of the characteristics and advantages for the present invention, rather than limitation to the scope of the claims of the present application.

The Fisher particle diameter referred in the Examples the particle diameter measured with Fisher Sub-sieve sizer, also known as Fisher transmitter. The specific surface area of the particles is obtained according to the height difference (h) between the liquid levels in the two tubes of differential pressure gauge that is caused by the pressure difference generated by the atmosphere passing through the bed of powder. And then he mean particle size is calculated according to the equation: the mean particle size (in micron)=6000/volume specific surface area (in square centimeter/gram).

Example 1

120 kg of KCl and 100 kg of KF were charged into a reducing furnace, and temperature was increased according to predetermined program. When the temperature reached 920° C., 60 kg of $K_2TaF_7$ was added through feeding inlet, and 1500 g of tantalum nitride powder made of raw tantalum powder of Fisher particle diameter in a range of 0.3 to 0.45 μm was added simultaneously as seed crystal. After the charging, the temperature was elevated to 930° C., and the time for keeping temperature was recorded. After holding 1 hour at 930° C., the agitator blade was elevated, and the agitation continued. The temperature was decreased to 820° C. with a blower, and sodium was added smoothly. Agitation was kept as the sodium was added. The temperature was kept at about 900° C. The amount of sodium added in the reduction reaction was 18.5 kg. When the reaction temperature dropped rapidly, it was determined that the reduction reaction was over and the reduced material was obtained. Then the reduced material was subject to steps including crushing, water washing, acid washing, pelletizing etc., resulting in nitrogen-doped tantalum powder product.

Example 2

120 kg of KCl and 100 kg of KF were charged into a reducing furnace, and temperature was increased according to predetermined program. When the temperature reached 930° C., 60 kg of $K_2TaF_7$ was added through feeding inlet, and 1000 g of tantalum nitride powder made of raw tantalum powder of Fisher particle diameter in a range of 0.3 to 0.45 μm was added simultaneously as seed crystal. After the charging, the temperature was elevated to 930° C., and the time for keeping temperature was recorded. After holding 1 hour at 930° C., the agitator blade was elevated, and the agitation continued. The temperature was decreased to 820° C. with a blower, and sodium was added smoothly. Agitation was kept as the sodium was added. The temperature was kept at about 900° C. The amount of sodium added in the reduction reaction was 18.5 kg. When the reaction temperature dropped rapidly, it was determined that the reduction reaction was over and the reduced material was obtained. Then the reduced material was subject to steps including crushing, water washing, acid washing, pelletizing etc., resulting in nitrogen-doped tantalum powder product.

Example 3

120 kg of KCl and 100 kg of KF were charged into a reducing furnace, and temperature was increased according to predetermined program. When the temperature reached 930° C., 60 kg of $K_2TaF_7$ was added through feeding inlet, and 800 g of tantalum nitride powder made of raw tantalum powder of Fisher particle diameter in a range of 0.3 to 0.45 μm was added simultaneously as seed crystal. After the charging, the temperature was elevated to 930° C., and the time for keeping temperature was recorded. After holding 1 hour at 930° C., the agitator blade was elevated, and the agitation continued. The temperature was decreased to 820° C. with a blower, and sodium was added smoothly. Agitation was kept as the sodium was added. The temperature was kept at about 900° C. The amount of sodium added in the reduction reaction was 18.5 kg. When the reaction temperature dropped rapidly, it was determined that the reduction reaction was over and the reduced material was obtained. Then the reduced material was subject to steps including crushing, water washing, acid washing, pelletizing etc., resulting in nitrogen-doped tantalum powder product.

Example 4

120 kg of KCl and 100 kg of KF were charged into a reducing furnace, and temperature was increased according to predetermined program. When the temperature reached 910° C., 60 kg of $K_2TaF_7$ was added through feeding inlet, and 600 g of tantalum nitride powder made of raw tantalum powder of Fisher particle diameter in a range of 0.3 to 0.45 µm was added simultaneously as seed crystal. After the charging, the temperature was elevated to 930° C., and the time for keeping temperature was recorded. After holding 1 hour at 930° C., the agitator blade was elevated, and the agitation continued. The temperature was decreased to 820° C. with a blower, and sodium was added smoothly. Agitation was kept as the sodium was added. The temperature was kept at about 900° C. The amount of sodium added in the reduction reaction was 18.5 kg. When the reaction temperature dropped rapidly, it was determined that the reduction reaction was over and the reduced material was obtained. Then the reduced material was subject to steps including crushing, water washing, acid washing, pelletizing etc., resulting in nitrogen-doped tantalum powder product.

Example 5

120 kg of KCl and 100 kg of KF were charged into a reducing furnace, and temperature was increased according to predetermined program. When the temperature reached 900° C., 60 kg of $K_2TaF_7$ was added through feeding inlet, and 300 g of tantalum nitride powder made of raw tantalum powder of Fisher particle diameter in a range of 0.3 to 0.45 µm was added simultaneously as seed crystal. After the charging, the temperature was elevated to 930° C., and the time for keeping temperature was recorded. After holding 1 hour at 930° C., the agitator blade was elevated, and the agitation continued. The temperature was decreased to 820° C. with a blower, and sodium was added smoothly. Agitation was kept as the sodium was added. The temperature was kept at about 900° C. The amount of sodium added in the reduction reaction was 18.5 kg. When the reaction temperature dropped rapidly, it was determined that the reduction reaction was over and the reduced material was obtained. Then the reduced material was subject to steps including crushing, water washing, acid washing, pelletizing etc., resulting in nitrogen-doped tantalum powder product.

Comparative Example 6

120 kg of KCl and 100 kg of KF were charged into a reducing furnace, and temperature was increased according to predetermined program. When the temperature reached 930° C., 60 kg of $K_2TaF_7$ was added through feeding inlet. After the charging, the temperature was elevated to 930° C., and the time for keeping temperature was recorded. After holding 1 hour at 930° C., the agitator blade was elevated, and the agitation continued. The temperature was decreased to 820° C. with a blower, and sodium was added smoothly. Agitation was kept as the sodium was added. The temperature was kept at about 900° C. The amount of sodium added in the reduction reaction was 18.5 kg. When the reaction temperature dropped rapidly, it was determined that the reduction reaction was over and the reduced material was obtained. Then the reduced material was subject to steps including crushing, water washing, acid washing, pelletizing etc., resulting in a product which we needed.

Nitrogen was not purposely doped in this Comparative Example. The nitrogen in the sample was brought in when the tantalum powder formed oxide film in the air.

The resulting six samples were analyzed. The comparison results of the properties are shown in Table 1.

TABLE 1

Element contents in the tantalum powder (in ppm)

| Smaple | O | C | N | Fe | Si | P | K |
|---|---|---|---|---|---|---|---|
| Ex. 1 | 3260 | 28 | 3420 | 10 | 12 | 130 | 30 |
| Ex. 2 | 3780 | 35 | 2300 | 12 | 15 | 120 | 30 |
| Ex. 3 | 3920 | 36 | 1820 | 15 | 16 | 130 | 32 |
| Ex. 4 | 4030 | 30 | 1400 | 13 | 14 | 120 | 33 |
| Ex. 5 | 4150 | 28 | 810 | 16 | 12 | 130 | 34 |
| Com. Ex. 6 | 4220 | 28 | 520 | 12 | 14 | 126 | 31 |

All of the test methods of the element in the tantalum powder are according to Chinese national standards such as GB/T 15076.8-2008, GB/T 15076.9-2008, GB/T 15076.12-2008, GB/T 15076.14-2008, GB/T 15076.15-2008, GB/T 15076.16-2008, and Chemical Analytic Technique for Tantalum and Niobium.

As seen from Table 1, the amounts of doped nitrogen in Examples 1 to 5 are higher than that in Comparative Example 6. It means that nitrogen-doping effect through tantalum nitride powder is better than that of traditional nitrogen-doping method. Tantalum powder with high nitrogen content can be obtained by the method according to the present invention.

TABLE 2

Physical Properties of the Tantalum Powder

| Smaple | Fsss (µm) | SBD (g/cc) | +80 (%) | −400 (%) |
|---|---|---|---|---|
| Ex. 1 | 1.60 | 1.50 | 0.10 | 30.16 |
| Ex. 2 | 1.54 | 1.52 | 0.02 | 36.80 |
| Ex. 3 | 1.56 | 1.50 | 0.06 | 25.96 |
| Ex. 4 | 1.50 | 1.45 | 0.00 | 28.92 |
| Ex. 5 | 1.64 | 1.56 | 0.10 | 30.52 |
| Com. Ex. 6 | 1.62 | 1.52 | 0.12 | 28.68. |

In Table 2:

FSSS represents Fisher particle diameter of tantalum particles.

SBD represents apparent density of powder, referring to tap density measured after the powder freely fills a standard vessel under specified conditions, i.e. mass of the powder per unit volume when packed loosely, expressed in $g/cm^3$. It is a method property of powder. The measuring method used herein is funnel method in which powder freely drops from a funnel hole at a certain height to fill a vessel.

+80(%) represents the proportion of particles larger than 80 mesh in all particles, and −400(%) represents the proportion of particles smaller than 400 mesh. The mesh refers to mesh number per inch (25.4 mm) on a screen.

TABLE 3

Comparison of Electrical Performance (sintering condition: 1250° C./20 min, Vf: 20 V, pressed density: 5.0 g/cc)

| Sample | I (µA/g) | K × 10⁻⁴ (µA/µFV) | CV (µFV/g) | tgδ (%) | SHV (%) |
|---|---|---|---|---|---|
| Ex. 1 | 35.0 | 3.6 | 97815 | 45.7 | 1.8 |
| Ex. 2 | 22.0 | 2.2 | 101520 | 40.7 | 1.2 |
| Ex. 3 | 24.4 | 2.4 | 100108 | 41.6 | 1.5 |
| Ex. 4 | 34.0 | 3.5 | 98763 | 44.0 | 1.9 |
| Ex. 5 | 36.0 | 3.7 | 96600 | 43.1 | 1.3 |
| Com. Ex. 6 | 44.5 | 4.7 | 95060 | 40.5 | 2.1 |

All of the test method and device of the electrical performance of tantalum powder are according to Chinese national standards GB/T 3137-2007, Experiment Technique for Electrical Performance of Tantalum Powder.

In Table 3:

Sintering condition: 1250° C./20 min means that the tantalum powder is sintered at 1250° C. for 20 minutes to obtain anode block.

Vf: 20V means energization at voltage of 20V.

Pressed density: 5.0 g/cc means that the pressed density of the anode block is 5.0 g/cc.

K×10$^{-4}$ (µA/µV) represents leakage current, hereinafter referred to as K value. Capacitance media cannot be absolutely non-conducting, so when direct voltage is applied to capacitance, the capacitor may generate leakage current. If the leakage current is too high, the capacitor may heat up and fail. When specified direct working voltage is applied to the capacitor, it will be observed that the change of charging current is initially great, and decreases over time, and reaches a relatively stable state until a final value. This final value is called as leakage current.

CV (µFV/g) represents specific capacity, i.e. electric quantity that can be released by unit weight of cell or active substrate.

tgδ (%) represent capacitor loss. Capacitor loss is actually reactive power consumed by a capacitor. Thus it can be defined as that capacitor loss also refers to the ratio between reactive power consumed under electric field and total consumed power, expressed as: tangent of capacitor loss angle=reactive power/total power, or tangent of capacitor loss angle=reactive power×100/total power (resulting value is a percentage)

SHV (%) represents volume shrinkage of capacitor anode block.

TABLE 4

Comparison of Electrical Performance (sintering condition: 1300° C./20 min Vf: 20 V, pressed density: 5.0 g/cc)

| Sample | I (µA/g) | K × 10$^{-4}$ (µA/µFV) | CV (µFV/g) | tgδ (%) | SHV (%) |
|---|---|---|---|---|---|
| Ex. 1 | 33.0 | 3.5 | 93500 | 43.0 | 2.7 |
| Ex. 2 | 20.0 | 2.1 | 96921 | 38.6 | 1.6 |
| Ex. 3 | 28.6 | 3.0 | 95169 | 40.1 | 1.8 |
| Ex. 4 | 33.1 | 3.4 | 96096 | 42.8 | 2.1 |
| Ex. 5 | 33.2 | 3.4 | 96491 | 43.0 | 2.2 |
| Com. Ex. 6 | 33.0 | 3.5 | 92500 | 45.0 | 2.7 |

The data in the above tables (especially in Table 3) show that with regard tantalum powder of capacitor grade, specific capacitance (CV value) of the tantalum powder increases, leakage current (K value) decreases, and loss (tgδ%) decreases as the amount of doped nitrogen increases. However, when nitrogen content is more than 3000 ppm (Example 1), specific capacitance (CV value) of the tantalum powder decreases, leakage current (K value) and loss (tgδ%) begin to increase, and the electrical performance degrades.

If the amount of doped nitrogen is relatively low (Example 5), there is problems such as too low specific capacitance (CV value) of the tantalum powder, too high leakage current (K value) and loss (tgδ%), which is not preferred.

FIG. 1 shows a curve graph in which K values of the products of Examples 1 to 5 and Comparative Example 6 change with nitrogen content.

Therefore, with regard to the tantalum powder with high specific capacitance according to the present invention, when nitrogen content is controlled in a range of 1000 to 3000 ppm, leakage current of the sample is relatively low, and electrical performance of the tantalum powder is preferred.

The present invention enable effective control of nitrogen content in tantalum powder by adding TaN with high nitrogen content as seed crystal during the reduction. Also, the tantalum prepared by this method has uniform nitrogen content and relatively small particle diameter of primary particles. The greatest characteristic of this method is that the nitrogen in tantalum nitride diffuses between particles of the tantalum powder, with substantially no loss, and thus the nitrogen content can be accurately controlled.

The description and the Examples according to the present invention disclosed herein are illustrative. It is apparent to a person skilled in the art that the present invention includes other more embodiments, and the actual scope and spirit of the present invention is defined by the claims.

The invention claimed is:

1. A method for preparing tantalum powder of capacitor grade, comprising:
   (1) feeding KCl and KF into a reactor, and increasing a reaction temperature;
   (2) feeding K$_2$TaF$_7$ to the reactor, and simultaneously feeding tantalum nitride powder to the reactor depending on desired amount of doped nitrogen;
   (3) heating the reactor to 880 to 930° C., and maintaining the reaction temperature;
   (4) cooling the reactor to 800 to 880° C., and feeding sodium to the reactor;
   (5) maintaining the reaction temperature at 880 to 930° C. until the reaction temperature drops rapidly; and
   (6) after-treating the tantalum powder resulted from step (5), and obtaining nitrogen-doped tantalum powder product.

2. The method according to claim 1, wherein the tantalum powder for preparing the tantalum nitride powder which is fed in step (2) has the same mean particle diameter as the tantalum powder product resulted from step (6).

3. The method according to claim 1, wherein the amount of doped nitrogen is 1000 to 3000 ppm.

4. The method according to claim 1, wherein the weight ratio between the sodium which is fed in step (4) and the K$_2$TaF$_7$ which is fed in step (2) is in a range of 30 to 32:100.

5. The method according to claim 1, wherein step (2) is performed at 900 to 950° C.

6. The method according to claim 1, wherein steps (3) to (5) are performed under agitation.

7. The method according to claim 6, wherein agitator blades are used, and the agitator blade are elevated in step (4).

8. The method according to claim 1, wherein the time for keeping the temperature in step (3) is at least 1 hour.

9. The method according to claim 1, wherein the after-treatment in step (6) includes crushing, water washing, acid washing, pelletizing or a combination thereof.

10. Tantalum powder prepared by the method according to claim 1, wherein the nitrogen content in the tantalum powder is uniform.

11. A tantalum anode made of the tantalum powder according to claim 10.

12. A tantalum capacitor comprising the tantalum anode according to claim 11.

* * * * *